United States Patent [19]

Babina et al.

[11] 4,195,019

[45] Mar. 25, 1980

[54] WOOD AND PHENOL-FORMALDEHYDE COMPRESSION-MOULDING COMPOSITION AND METHOD FOR PREPARING THE SAME

[75] Inventors: Margarita D. Babina; Anna P. Gabets; Ida I. Pereskokova; Galina I. Popova, all of Sverdlovsk, U.S.S.R.

[73] Assignees: Nizhnetagilskoe Proizvodstvennoe Obiedinenie "Uralkhimplast"; Uralsky Lesotekhnichesky Institut, both of Sverdlovsk, U.S.S.R.

[21] Appl. No.: 949,726

[22] Filed: Oct. 10, 1978

[51] Int. Cl.$^2$ .............................................. C08L 1/02
[52] U.S. Cl. .................................................. 260/17.2
[58] Field of Search ....................................... 260/17.2

[56] References Cited

FOREIGN PATENT DOCUMENTS 1569463 12/1972 Fed. Rep. of Germany .......... 260/17.2
1430343  3/1976 United Kingdom ..................... 260/17.2

OTHER PUBLICATIONS

Chem. Absts. vol. 71:40452w, Polycondensation of Phenol and Formaldehyde, Krasnoselov et al.
Chem. Abst. vol. 71:13739p, Hanenable Phenolic Molding Compositions, Ruetgers-Werke.
Chem Absts. vol. 81:111220p, Purification of Water—Production—Phenolformaldehyde Resins, Krasnoselov et al.
Chem. Absts. 86:173343t, Role—Wood Pulp Modified—P/Foligomer, Popva et al.

*Primary Examiner*—Edward M. Woodberry
*Attorney, Agent, or Firm*—Ladas, Parry, Von Gehr, Goldsmith & Deschamps

[57] ABSTRACT

The compression-moulding composition according to the present invention contains 95 to 98 parts by weight of a product resulting from the treatment of crushed wood with an aqueous solution of phenol and formaldehyde at the boiling temperature of said solution in the presence of hydrochloric acid at a weight ratio between phenol formaldehyde, water, hydrochloric acid and crushed wood equal to 0.15–0.40:0.048–0.27:10–15:0.07–24–0.1086:1 respectively, 1 to 3 parts by weight of a curing agent, viz. hexamethylenetetramine, 0.5 to 1 part by weight of a curing accelerator such as calcium oxide or magnesium oxide and 0.5 to 1.0 part by weight of a lubricant such as stearing, oleic acid or stearates. The compression-moulding composition of the present invention has an increased water-resistance (its water-absorption is at most 42–82 mg), a high curing rate (0.57–0.8 min/mm), elevated Martens yield temperature (up to 146° C.) thus making it possible to widen the field of application of the compression-moulding composition. A method for preparing the compression-moulding composition according to the present invention comprises agitation of said components simultaneously with disintegration thereof at a temperature of 97–99°0 C. to the content of volatile compounds of from 6 to 10% by weight. The method is simple in implementation, it has a reduced number of technological steps and lowered power- and labour-consumption in the manufacture of a compression-moulding composition.

6 Claims, No Drawings

WOOD AND PHENOL-FORMALDEHYDE COMPRESSION-MOULDING COMPOSITION AND METHOD FOR PREPARING THE SAME

The present invention relates to compression-moulding compositions and methods for producing same.

FIELD OF THE INVENTION

Said compression-moulding compositions (press-materials) namely compositions with a small content of a binder (up to 30% by weight) are extensively used for the manufacture of simple-shape articles employed in mechanical engineering, tractor industry and, civil engineering.

BACKGROUND OF THE INVENTION

For the manufacture of such compositions as the binder use is predominantly made of water-soluble resol phenol-formaldehyde resins or mixtures thereof with phenolalcohols, as well as carbamide resins. As the filler use is made mainly of crushed wood in the for of saw-dust, chips and the like.

Thus, compression-moulding compositions which incorporate a binder in the form of viscous resol phenol-formaldehyde resins or carbamide resins and a filler, viz. crushed wood are known. However, these resins do not ensure a sufficient impregnation of wood. Articles manufactured from such compression-moulding compositions feature a low water-resistance, unsatisfactory appearance and insufficient curing rate. Furthermore, the use of viscous binders adds to production costs of the final articles. Improved impregnation of wood particles is ensured due to a partial replacement of viscous binders with less viscous products of initial condensation of resin-forming monomers (phenolalcohols, urea-formaldehyde condensates).

Increased water-resistance and curing rate of the composition are ensured due to incorporation of fast-curing resins or various additives into the composition. As a curing agent in said compositions use is made of hexamethylenetetramine and as curing accelerators use is made of calcium oxide or magnesium oxide.

A compression-moulding composition based on a water-soluble resol phenol-formaldehyde resin, wood saw-dust, and purpose additive, is also known in the art the ingredients being present in the following amounts; resin 30% by weight, sawdust 67% by weight, oleic acid 0.8% by weight (as a lubricant it is also possible to use stearin, calcium stearate), watersoluble nigrosine 2.2% by weight produced by the known method.

This prior art compression-moulding composition has the following characteristics: water-absorption up to 370 mg, curing rate 1 min/m, hardness 180.0 MPa/m$^2$. Low water-resistance, absence of gloss, rough surface, non-uniform colour of articles do not make possible to widen the range of application of this composition.

Another disadvantage of the composition resides in high cost of articles produced therefrom due to a low curing rate which results in a longer time of residence of the composition under pressure during processing.

Conventional methods for preparing compression-moulding compositions from phenol-formaldehyde resins and an organic filler comprise intermixing of a binder, a filler and additives, followed by homogenization of the mixture by rolling at a temperature within the range of from 80° to 145° C., cooling and grinding of the material. Total duration of the process is about 2 hours. During hot-rolling of the mixture there occurs, in addition to homogenization, its polycondensation wherefore it becomes difficult to attain a required polymerization degree of the mixture.

This disadvantage may be overcome by separation of said stages, i.e. by performing the stage of homogenization at a temperature of at most 90° C., followed by a heat-treatment of the mixture to a required degree of polymerization.

These prior art methods have disadvantages residing in their multi-stage character (mixing of the components, rolling, cooling, crushing of the rolled material, fine grinding, screening), high rate of power- and labour-consumption, unsatisfactory sanitary and hygienic conditions of labour, especially at the stage of rolling.

Apart from the methods, wherein a filler is combined with a high-viscous binder, known in the art are methods for preparing compression-moulding compositions, wherein the filler is treated with an aqueous solution of phenol, formaldehyde, and an acid at a temperature of up to 300° C. under a pressure of from 20 to 200 kg/cm$^2$ or by treating a filler with phenol and an aldehyde in the presence of ethylene- and diethyleneglycol employed as a plastifying agent. The process is carried out in an extruder at a temperature within the range of from 130° to 250° C.

Disadvantages of the above-described prior art methods reside in the necessity of performing the process at high temperatures and pressures thus complicating the process technology due to retaining labour-consuming stages necessitating crushing and grinding of the material.

A method known in the art for preparing compression-moulding compositions based on a water-soluble resol phenol-formaldehyde resin, a mixture of saw dust and ground wastes of plywood, wherein fine wood particles are preliminary dried, mixed with the resin, curing agent, dye, and a lubricant in a mixer of the "runner" type. Then the resulting wet mixture is dried at a temperature within the range of from 80° to 90° C. and screened.

This prior art method has a disadvantage residing in a multi-stage character of the process and a long duration thereof (more than 4 hours). Furthermore, the use of rather large wood particles does not ensure high characteristics of a compression-moulding composition.

SUMMARY OF THE INVENTION

It is an object of the present invention to provide such a formulation of a compression-moulding composition which would make it possible to ensure a high water-resistance and a high curing rate of a compression-moulding composition and a commercial appearance of the final articles produced therefrom along with other characteristics satisfying requirements of the modern standards.

This and other objects of the present invention are accomplished by incorporation into a compression-moulding composition containing a filler, a curing agent, viz. hexamethylenetetramine, a curing accelerator such as calcium oxide or magnesium oxide, and a lubricant such as stearin, oleic acid or stearates, in accordance with the present invention, as the filler, a product resulting from the treatment of crushed wood with an aqueous solution of phenol and formaldehyde at the boiling temperature of said solution in the presence of hydrochloric acid at a weight ratio between phenol, formaldehyde, water, hydrochloric acid, crushed wood equal to 0.15–0.40:0.048–0.27:10–15:0.0724–0.1086–1 respectively, the components are present in the composition in the following proportions, parts by weight:
filler: 95–98
curing agent: 1–3
curing accelerator: 0.5–1
lubricant: 0.5–1.

As it has been mentioned hereinbefore, the filler selected in accordance with the present invention comprises a product resulting from the treatment of crushed wood with an aqueous solution of phenol and formaldehyde. For this reason, it incorporates 77 to 84% by weight of the wood component and 16 to 23% by weight of the novolac-type resin; in the formation of the latter resin reactive components of the wood also take part, wherefore the employed product has properties of not only a filler but of a binder as well.

Owing to good impregnation of wood particles with the resin formed during their treatment, the composition has a full spectrum of necessary properties and requires no addition of a binder. The amount of the product of treatment of crushed wood with an aqueous solution of phenol and formaldehyde to be added into the composition is varied depending on its nature defined by the condition of the product preparation (composition of the aqueous solution of phenol and formaldehyde, weight ratio between the aqueous solution and crushed wood).

The selected amounts of the product are sufficient to ensure the range of necessary characteristics of a compression-moulding composition.

As the curing agent the composition incorporates hexamethylenetetramine and as a curing accelerator-calcium oxide or magnesium oxide.

Lowering the amount of the curing agent and curing accelerator below the above-indicated lower limit does not ensure the required rate of curing of the composition and entails a longer time of residence of the composition under pressure during its processing. Increasing said amounts above their upper limit indicated hereinabove impairs properties of the composition and complicates its processing.

As a lubricant use is made of stearin, oleic acid or stearates, preferably those of calcium. The lubricant prevents adherence of the articles manufactured from the composition according to the present invention to the mould. The amounts of the lubricant as selected according to the present invention are optimal. These ensure a good processability of the compression-moulding composition and adequately high mechanical characteristics thereof.

The articles produced as a result of processing of the compression-moulding composition according to the present invention have a dark-brown colour due to the presence of the above-specified filler. To impart a different colour to the article, the composition may be added with a dye; for example, to impart black colour to the articles, nigrosine is added into the composition in an amount ranging from 1.1 to 1.5 part by weight. The thus selected amount of the dye ensures uniformity of coloration of the final articles.

The method for preparing a compression-moulding composition according to the present invention comprises intermixing of 95–98 parts by weight of a product of treatment of crushed wood with an aqueous solution of phenol and formaldehyde at the boiling temperature of said solution in the presence of hydrochloric acid at a weight ratio between phenol, formaldehyde, water, hydrochloric acid and crushed wood equal to 0.15–0.40:0.048–0.27:10–15:0.0724–0.1086:1 respectively, 1 to 3 parts by weight of a curing agent, viz. hexamethylenetetramine, 0.5 to 1 part by weight of a curing accelerator such as calcium oxide or magnesium oxide and 0.5 to 1 part by weight of a lubricant, i.e. stearin, oleic acid or stearates simultaneously with grinding of said components at a temperature of 97°–99° C. to a content of the volatile components of from 6 to 10% by weight.

As it has been mentioned hereinabove, it is advisable to add a dye into the composition in an amount of from 1.1 to 1.5 part by weight, e.g. nigrosine, which is added at the stage of blending of the components.

The use of a product resulting from the treatment of crushed wood with an aqueous solution of phenol and formaldehyde does not require incorporation of any additional amount of a binder into the composition, since said product is in the form of wood particles modified with the resin formed during their treatment by means of said aqueous solution of phenol and formaldehyde. In the formation of the product, in addition to phenol and formaldehyde, reactive components of wood also take part. This has a positive effect on water-resistance of the compression-moulding composition (water-absorption is 42 mg), curing rate (residence time under pressure is 0.5–0.8 min/mm).

Increased curing rate of the compression-moulding composition makes it possible to obtain a higher output during processing of the composition. The presence of a novolac-type resin in the composition as compared with generally used resol-type resins in similar compositions also improves processing of the compression-moulding composition. In addition to a high water-resistance and increased curing rate, the compression-moulding composition according to the present invention also has an elevated heat-resistance (up to 164° C.), high dielectric properties, hardness (up to 453.0 MPa). The articles manufactured from the compression-moulding composition according to the present invention have a uniform colour and gloss. This gives an attractive commercial appearance to the articles. In the manufacture of plate-like materials from the compression-moulding composition according to the present invention swelling does not exceed 1 to 1.5%.

Preparation of the compression-moulding composition by the method according to the present invention provides an additional economic effect.

Preparation of the compression-moulding composition by the method according to the present invention makes it possible to use a product of treatment of crushed wood with a particle size of from 3 to 5 mm without any preliminary disintegration of the product, while retaining a good appearance of the final articles.

The method according to the present invention makes it possible to perform preparation of a compression-moulding composition in a single stage thus avoiding multi-stage character of the process and substantially reducing power and labour consumption.

DETAILED DESCRIPTION OF THE INVENTION

The method for preparing a compression-moulding composition according to the present invention is technologically simple and performed in the following manner.

Components of the composition in the above-specified amounts are charged into a high-speed mixer. The mixer is provided with a blending means rotating at a speed of up to 3,000 r.p.m., a jacket and a cooler.

Under constant agitation, the contents of the mixer is heated to a temperature of 97°–99° C. by way of supplying a heating agent into the jacket and stirring is continued under these conditions till the content of volatile compounds in said mixture becomes equal to 6–10% by weight. During the stirring the mixture is dried and disintegrated at the same time due to friction between particles and related liberation of heat. The degree of disintegration (fineness), the final content of volatile compounds as well as duration of mixing may be controlled by variation of rotation speed of the blending means. Mixing temperature is controlled by varying the heating agent supply into the mixer jacket.

For a better understanding of the present invention, the following specific Examples are given by way of illustration.

EXAMPLE 1

Into a high-speed mixer provided with a blending means rotating at a speed of up to 3,000 r.p.m., a jacket and a cooler there are charged 3.0 parts by weight of hexamethylene tetramine, 1.0 part by weight of calcium oxide, 0.5 part by weight of stearin, 1.5 part by weight of nigrosine and 95 parts by weight of a product of treatment of crushed wood (pine tree) with an aqueous solution of phenol and formaldehyde at the boiling temperature of the solution in the presence of hydrochloric acid.

The product is prepared at the weight ratio of phenol, formaldehyde, water, hydrochloric acid and crushed wood equal to 0.4:0.27:10:0.0724:1 respectively.

The mass in the mixer is agitated for 2–3 minutes and then heated to a temperature of 97°–99° C. under continuous agitation. Simultaneously therewith, disintegration of the mixture occurs. Agitation with simultaneous disintegration at the above-mentioned temperature till the content of volatile compounds in the compression-moulding composition becomes equal to 6% by weight.

EXAMPLE 2

Into a high-speed mixer described in the foregoing Example 1 there are charged 2.0 parts by weight of hexamethylenetetramine, 1.0 part by weight of magnesia, 0.5 part by weight of stearin and 96.5 part by weight of a product resulting from the treatment of crushed wood (mixed pine tree and birch) with an aqueous solution of phenol and formaldehyde at the boiling temperature of the solution in the presence of hydrochloric acid.

The product is obtained at the weight ratio between phenol, formaldehyde, water, hydrochloric acid and crushed wood equal to 0.34:0.19:10:0.0724:1 respectively.

The mass in the mixer is blended for 2–3 minutes and then heated, still under continuous agitation, to a temperature of 97°–99° C.; simultaneously with blending, the mixture is also disintegrated. The agitation with simultaneous disintegration is conducted at the above-indicated temperature till the content of volatile compounds incorporated in the compression-moulding composition is made equal to 10% by weight.

EXAMPLE 3

Into the high-speed mixer described in the foregoing Example 1 there are charged 1.0 part by weight of hexamethylenetetramine, 0.5 part by weight of magnesia, 0.5 part by weight of calcium stearate and 98.0 parts by weight of a product resulting from the treatment of crushed wood (mixture of pine, birch, larch) with an aqueous solution of phenol and formaldehyde at the boiling temperature of the solution in the presence of hydrochloric acid.

The product is obtained with the use of waste waters resulting from the production of phenol and formaldehyde and added with hydrochloric acid at the weight ratio between phenol, formaldehyde, water, hydrochloric acid and crushed wood equal to 0.15:0.098:15:0.1086:1 respectively.

The mass in the mixer is agitated for 2–3 minutes and then heated, still under continuous agitation, to a temperature of 97°–99° C. Simultaneously with blending the mixture is also disintegrated. Agitation with simultaneous disintegration of the mixture is conducted at this temperature till the content of volatile compounds in the compression-moulding composition is made equal to 6% by weight.

EXAMPLE 4

Into the high-speed mixer described in the foregoing Example 1 there are charged 3.0 parts by weight of hexamethylenetetramine, 1.0 part by weight of calcium oxide, 0.5 part by weight of oleic acid and 95 parts by weight of a product resulting from the treatment of crushed wood (mixture of pine, spruce and larch) with an aqueous solution of phenol and formaldehyde at the boiling temperature of the solution in the presence of hydrochloric acid.

The product is obtained with the use of waste waters resulting from the production of phenol and formaldehyde and added with hydrochloric acid at the weight ratio between phenol, formaldehyde, water, hydrochloric acid and crushed wood equal to 0.34:0.19:10:0.0724:1 respectively.

The mixer content is stirred for 2–3 minutes and then, under continuous agitation, heated to a temperature of 97°–99° C. Simultaneously with blending, the mixture is also disintegrated. This agitation with simultaneous disintegration is conducted at this temperature till the content of volatile products in the compression-moulding composition is made equal to 6.5% by weight.

EXAMPLE 5

Into the high-speed mixer described in Example 1 hereinbefore there are charged 2.5 parts by weight of hexamethylenetetramine, 0.5 part by weight of calcium oxide, 0.6 part by weight of calcium stearate and 96.4 parts by weight of a product resulting from the treatment of crushed wood (mixture of pine and spruce) with an aqueous solution of phenol and formaldehyde at the boiling temperature of the solution in the presence of hydrochloric acid.

The product is obtained at the weight ratio of phenol, formaldehyde, water and hydrochloric acid equal to 0.36:0.21:12:0.087:1 respectively.

The mass in the mixture is agitated for 2–3 minutes and then, still under constant agitation, heated to a temperature of 97°–99° C. Simultaneously with blending the mixture is also disintegrated. Said agitation along with disintegration at this temperature is conducted till the content of volatile products in the compression-moulding composition is made equal to 6.5% by weight.

EXAMPLE 6

Into the high-speed mixer described in the foregoing Example 1 there are charged 1.0 part by weight of hexamethylenetetramine, 0.5 part by weight of calcium oxide, 1.0 part by weight of calcium stearate, 1.1 part by weight of nigrosine and 96.4 parts by weight of a product resulting from the treatment of crushed wood (mixture of pine and larch) with an aqueous solution of phenol and formaldehyde at the boiling temperature of the solution in the presence of hydrochloric acid.

The product is obtained at the weight ratio between phenol, formaldehyde, water, hydrochloric acid and crushed wood equal to 0.15:0.048:10:0.0724:1 respectively.

The mass in the mixer is agitated for 2-3 minutes and then, still under continuous agitation, heated to the temperature of 97°-99° C. Simultaneously with blending the mixture is also disintegrated. Said agitation together with disintegration is continued at the above-mentioned temperature till the content of volatile compounds in the compression-moulding composition is made equal to 9% by weight.

EXAMPLE 7

Into the high-speed mixture described in Example 1 hereinbefore there are charged 2.0 parts by weight of hexamethylenetetramine, 1.0 part by weight of calcium oxide, 1.0 part by weight of stearin and 96.0 parts by weight of a product resulting from the treatment of crushed wood (mixture of pine, birch, spruce and larch) with an aqueous solution of phenol and formaldehyde at the boiling temperature of the solution in the presence of hydrochloric acid.

The product is obtained at the weight ratio of phenol, formaldehyde, water, hydrochloric acid and crushed wood equal to 0.4:0.217:10:0.0724:1 respectively.

The mass in the mixture is agitated for 2-3 minutes and then heated, under continuous agitation, to a temperature of 97°-99° C. Simultaneously with blending, the mixture is also disintegrated. Agitation simultaneously with disintegration is conducted at the above-indicated temperature till the content of volatile products in the compression-moulding composition is equal to 7% by weight.

Properties of the compression-moulding composition produced as in Example 1 to 7 hereinabove are shown in the following Table.

Table

| Characteristics | Properties of compression moulding compositions of Examples | | | | | | |
|---|---|---|---|---|---|---|---|
| | 1 | 2 | 3 | 4 | 5 | 6 | 7 |
| Impact resistance, kJ/m$^2$ | 4.6 | 5.01 | 4.9 | 5.16 | 4.8 | 4.7 | 4.7 |
| Breaking stress, MPa | | | | | | | |
| at static bending | 57.1 | 60.5 | 55.5 | 62.1 | 59.2 | 54.7 | 58.4 |
| at compression | 94.0 | 102.0 | 109.4 | 116.8 | 108.0 | 103.2 | 111.2 |
| Brinnel hardness, mPa | 348.0 | 388.0 | 342.0 | 453.0 | 324.0 | 294.0 | 331.0 |
| Water-absorption, mg | 68 | 49 | 62 | 42 | 56 | 82 | 59 |
| Shrinkage, % | 0.31 | 0.42 | 0.34 | 0.32 | 0.35 | 0.39 | 0.41 |
| Martens yield temperature, °C. | 162 | 154 | 149 | 157 | 156 | 151 | 164 |

Articles produced from the compositions of Examples 1 and 6 have black colour, while compositions of Examples 2, 3, 4, 5 and 7 have a dark-brown colour.

What is claimed is:

1. A compression-moulding composition containing 95 to 98 parts by weight of a product resulting from the treatment of crushed wood with an aqueous solution of phenol and formaldehyde at the boiling temperature of said solution in the presence of hydrochloric acid at a weight ratio between phenol, formaldehyde, water, hydrochloric acid, crushed wood equal to 0.15-0.40:0.048-0.27:10-15:0.0724-0.1086:1 respectively, 1 to 3 parts by weight of a curing agent, viz. hexamethylenetetramine, 0.5 to 1 part by weight of a curing accelerator selected from the group consisting of calcium oxide and magnesium oxide and 0.5 to 1 part by weight of a lubricant selected from the group consisting of stearin, oleic acid and stearates.

2. A compression-moulding composition as claimed in claim 1, wherein a dye is present in an amount of from 1.1 to 1.5 part by weight.

3. A compression-moulding composition as claimed in claim 2, wherein nigrosine is used as the dye.

4. A method for preparing a compression-moulding composition comprising intermixing 95 to 98 parts by weight of a product of treatment of crushed wood with an aqueous solution of phenol and formaldehyde at the boiling temperature of said solution in the presence of hydrochloric acid at a weight ratio between phenol, formaldehyde, water, hydrochloric acid, crushed wood equal to 0.15-0.40:0.048-0.27:10-15:0.0724-0.1086:1 respectively, 1 to 3 parts by weight of a curing agent, viz. hexamethylenetetramine, a curing accelerator selected from the group consisting of calcium oxide and magnesium oxide, and 0.5 to 1 part by weight of a lubricant selected from the group consisting of stearin, oleic acid and stearates simultaneously with grinding of the components at a temperature of 97 to 99° C. to a content of volatile products of from 6 to 10% by weight.

5. A method as claimed in claim 4, wherein said intermixing of the components is effected in the presence of a dye in an amount of from 1.1 to 1.5 part by weight.

6. A method as claimed in claim 5, wherein as the dye nigrosine is used.

* * * * *